(12) United States Patent
Lee et al.

(10) Patent No.: US 11,824,218 B2
(45) Date of Patent: Nov. 21, 2023

(54) BATTERY MODULE

(71) Applicant: SK INNOVATION CO., LTD., Seoul (KR)

(72) Inventors: Seung Hun Lee, Daejeon (KR); Tae Gu Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 185 days.

(21) Appl. No.: 17/385,395

(22) Filed: Jul. 26, 2021

(65) Prior Publication Data

US 2022/0052409 A1 Feb. 17, 2022

(30) Foreign Application Priority Data

Aug. 13, 2020 (KR) .................. 10-2020-0101615

(51) Int. Cl.
*H01M 50/293* (2021.01)
*H01M 50/289* (2021.01)
*H01M 50/242* (2021.01)
*H01M 50/204* (2021.01)
*H01M 50/271* (2021.01)

(52) U.S. Cl.
CPC ....... *H01M 50/293* (2021.01); *H01M 50/204* (2021.01); *H01M 50/242* (2021.01); *H01M 50/271* (2021.01); *H01M 50/289* (2021.01); *H01M 2200/10* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2010/0136404 A1* | 6/2010 | Hermann | ............... | H01M 50/24 429/120 |
| 2012/0028107 A1* | 2/2012 | Sugita | ............... | H01M 10/6555 429/156 |
| 2013/0130087 A1* | 5/2013 | Kawaguchi | ......... | H01M 10/658 429/120 |
| 2018/0309107 A1 | 10/2018 | Widener | | |
| 2020/0287256 A1* | 9/2020 | Honda | ................ | H01M 50/293 |

FOREIGN PATENT DOCUMENTS

| | | | |
|---|---|---|---|
| CN | 109987884 A | | 7/2019 |
| EP | 3142166 A1 | * | 3/2017 |
| KR | 10-2013-0049088 | * | 5/2013 |
| KR | 10-2013-0049088 A | | 5/2013 |
| KR | 10-1441207 B1 | | 9/2014 |
| KR | 10-2018-0036863 A | | 4/2018 |
| KR | 10-2018-0093288 A | | 8/2018 |
| KR | 10-2018-0105362 A | | 9/2018 |
| WO | 2018/062172 A1 | | 4/2018 |
| WO | WO-2021019495 A1 | * | 2/2021 |

OTHER PUBLICATIONS

Machine translation of KR 10-2013-0049088. (Year: 2013).*
Extended European Search Report for the European Patent Application No. 21187997.8 issued by the European Patent Office dated Dec. 17, 2021.

* cited by examiner

*Primary Examiner* — Gregg Cantelmo
(74) *Attorney, Agent, or Firm* — IP & T GROUP LLP (57) ABSTRACT

Provided is a battery module including a pad having characteristics of expanding at a predetermined temperature or higher, thereby blocking a path along which a high-temperature, high-pressure gas discharged from the battery cell in which an event occurs moves, and thus, the gas is prevented from spreading to other battery cells.

14 Claims, 9 Drawing Sheets

BATTERY MODULE

CROSS-REFERENCE TO RELATED APPLICATIONS

This application claims priority under 35 U.S.C. § 119 to Korean Patent Application No. 10-2020-0101615, filed on Aug. 13, 2020, in the Korean Intellectual Property Office, the disclosure of which is incorporated herein by reference in its entirety.

TECHNICAL FIELD

The following disclosure relates to a battery module capable of delaying or suppressing an event occurring in a battery cell using a pad including a material of which a volume expands at a predetermined temperature or higher.

BACKGROUND

Recently, electric vehicles (EVs) using a rechargeable electric battery as a power source or hybrid vehicles (HEVs) using an electric battery and another power source have been commercialized as eco-friendly vehicles. For battery modules applied to such electric vehicles and hybrid vehicles, pouch-type battery cells that accommodate a single battery cell in a pouch have been commonly used. Here, a plurality of battery cells are stacked and accommodated in a single battery module, and the number of battery cells is determined according to a required power level.

Here, because a plurality of battery cells are stacked in a battery module, an occurrence of an event such as local damage, fire, or leakage in one battery cell affects other battery cells, and if such an event is not quickly suppressed, the event may spread throughout the module, so the entire battery module may be discarded, or in severe cases, there may be a risk of explosion.

Meanwhile, a pad may be disposed between the battery cells to absorb a change in thickness due to tolerance during manufacture or expansion during use. In the related art, the pad is used merely to absorb tolerance due to a change in thickness by isolating battery cells, without a function of delaying or suppressing such an event occurring in the battery cells as mentioned above.

RELATED ART DOCUMENT

Patent Document

Korean Patent Laid-open Publication No. 10-2018-0036863

SUMMARY

An exemplary embodiment of the present invention is directed to providing a battery module in which a high-temperature, high-pressure gas discharged from a battery cell in which an event such as local damage occurs is prevented from spreading to other battery cells.

An exemplary embodiment of the present invention is directed to providing a battery module in which a battery cell in which an event such as local damage occurs is separated from another battery cell to delay the event.

In one general aspect, a battery module includes: a plurality of stacked battery cells; a side pad disposed between stack surfaces of the plurality of battery cells; and a case accommodating the plurality of battery cells and the side pad, wherein the side pad includes a material which is flame retardant and expands in volume at a predetermined temperature or higher.

The side pad may expand in volume at the predetermined temperature or higher so as to be in close contact with an upper inner wall and a lower inner wall of the case to block a path along which a gas discharged from a battery cell in which an event occurs, among the plurality of battery cells, moves to a battery cell in which the event does not occur, among the plurality of battery cells.

The material may include a mineral which expands in volume as internal moisture thereof is vaporized at the predetermined temperature or higher.

The mineral may be vermiculite.

The side pad may further include a high-temperature curable material.

The high-temperature curable material may include ceramic.

The high-temperature curable material may include 80 wt % to 90% wt % of mica and 10 wt % to 20 wt % of silicone.

The side pad may expand in volume at the predetermined temperature or higher so as to be in close contact with an upper inner wall and a lower inner wall of the case and then cured to form a barrier wall isolating a battery cell in which an event occurs, among the plurality of battery cells, and a battery cell in which the event does not occur, among the plurality of battery cells.

In another general aspect, a battery module includes: a plurality of stacked battery cells; a case accommodating the plurality of battery cells; and an upper pad disposed between the plurality of battery cells and an upper inner wall of the case, wherein the upper pad includes a material which is flame retardant and expands in volume at a predetermined temperature or higher.

The battery module may further include: a side pad disposed between stack surfaces of the plurality of battery cells, wherein a vertical length of the side pad is longer than a vertical length of the battery cell.

The upper pad may expand in volume at the predetermined temperature or higher so as to be in close contact with an upper inner wall of the case and an upper surface of the side pad to block a path along which a gas discharged from a battery cell in which an event occurs, among the plurality of battery cells, moves to a battery cell in which the event does not occur, among the plurality of battery cells.

The material may include a mineral which expands in volume as internal moisture thereof is vaporized at the predetermined temperature or higher.

The mineral may be vermiculite.

The upper pad may further include a high-temperature curable material.

The high-temperature curable material may include ceramic.

The battery module may further include a side pad disposed between the stack surfaces of the plurality of battery cells, wherein the side pad includes a material which is flame retardant and expands in volume at a predetermined temperature or higher.

The side pad may further include a high-temperature curable material.

Other features and aspects will be apparent from the following detailed description, the drawings, and the claims.

DETAILED DESCRIPTION OF EXEMPLARY EMBODIMENTS

Hereinafter, the present invention will be described in detail with reference to the accompanying drawings. Detailed descriptions of known functions and components that may unnecessarily obscure the subject matter of the present invention will be omitted.

In addition, terms such as "one surface", "the other surface", "one side", "the other side", "first" and "second" are used to distinguish one component from other components, and the components are not limited by these terms.

Figure 1:
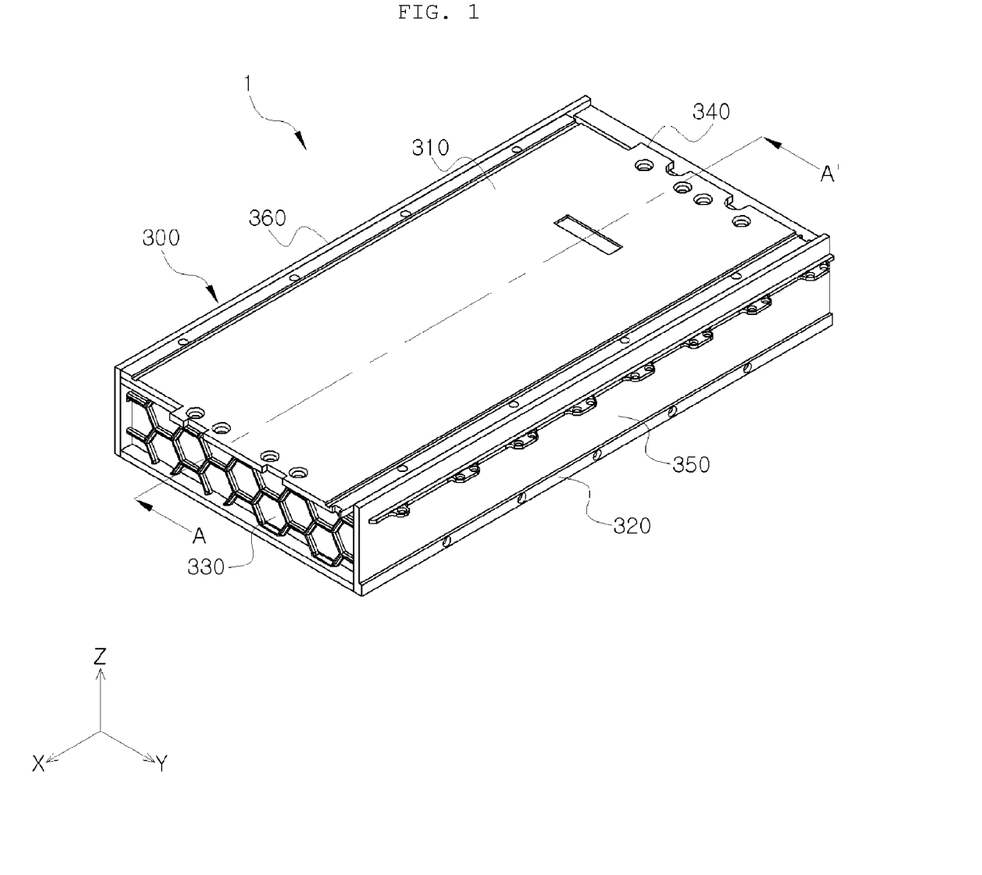
FIG. 1 shows a battery module according to a first exemplary embodiment of the present invention.
Figure 2:
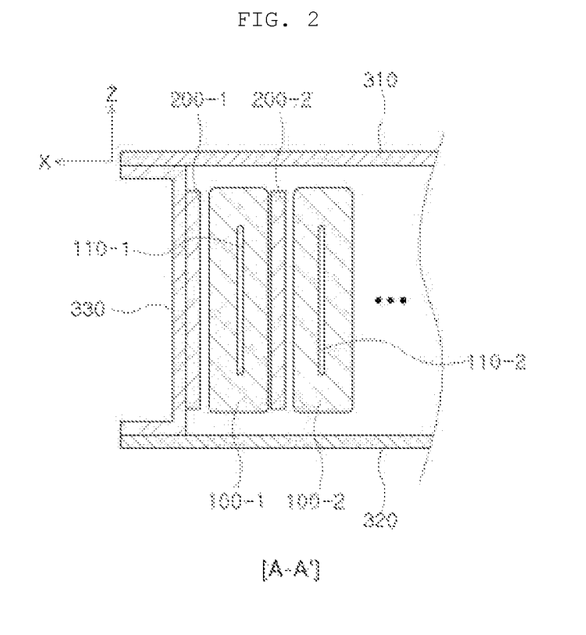
FIG. 2 is a cross-sectional view taken along line A-A' of FIG. 1.

FIG. 1 shows a battery module 1 according to a first exemplary embodiment of the present invention, and FIG. 2 is a cross-sectional view taken along line A-A' of FIG. 1.

The battery module 1 according to the first exemplary embodiment of the present invention includes a plurality of stacked battery cells 100, a side pad 200 disposed between stack surfaces on which the plurality of battery cells 100 are stacked, and a case 300 accommodating the plurality of battery cells 100 and the side pad 200.

First, a structure and direction of the case 300 of the battery module 1 will be described with reference to FIG. 1.

The case 300 has a hexahedral shape, and for convenience of explanation, a member provided in a Z-axis direction of FIG. 1 is defined as an upper plate 310 and a member provided on a surface opposite to the upper plate 310 is defined as a lower plate 320. In addition, members provided in the X-axis direction of FIG. 1 are defined as a first side plate 330 and a second side plate 340, and remaining members provided in a Y-axis direction of FIG. 1 are defined as a front plate 350 and a rear plate 360.

That is, the case 300 may include the upper plate 310, the lower plate 320, the first side plate 330, the second side plate 340, the front plate 350, and the rear plate 360. The case 300 may be configured by coupling respective detachable plates, or two or more plates may be integrated to constitute the case 300.

Referring to FIG. 2 illustrating a cross-section A-A' of FIG. 1, the case 300 of the battery module 1 according to the first exemplary embodiment of the present invention includes a plurality of battery cells 100 and a side pad 200 disposed between the battery cells 100.

A surface direction of the battery cells 100, that is, a direction in which the battery cells 100 are stacked, is the X-axis direction, and electrode tabs 110-1 and 110-2 of the battery cells 100 are drawn out in the Y-axis direction. When one surface of the battery cell 100 formed in the direction in which the battery cells 100 are stacked is referred to as a stack surface, the side pad 200 is disposed between the first side plate 330 and a stack surface of the battery cell 100, between the stack surfaces of the respective battery cells 100, and between the second side plate 340 and the stack surface of the battery cell 100.

That is, the first side plate 330, a side pad 200-1, a battery cell 100-1, a side pad 200-2, and a battery cell 100-2 are stacked in this order. Although FIG. 2 illustrates only two battery cells 100 and two side pads 200, it is obvious to a person skilled in the art that the number of battery cells 100 and the number of side pads 200 may be increased or decreased as needed.

Here, the side pad 200 includes a material (hereinafter, referred to as a "high-temperature expandable material") which is flame retardant and expands in volume at a predetermined temperature or higher.

In this case, the high-temperature expandable material may include a mineral which expands in volume as internal moisture thereof is vaporized at a predetermined temperature or higher, and preferably, the mineral may be vermiculite.

Vermiculite is a mineral which belongs to a monoclinic system having a crystal structure such as mica and is structurally a three-layered mica-like mineral containing 8% to 16% of a total weight of the three moistures including hygroscopic water, interlayer water, and crystal water. When such vermiculite is heated at temperatures ranging from 800° C. to 1,100° C., moisture present between the layers changes into water vapor and expands. Vermiculite exfoliates and expands to 6 to 30 times its original volume to become expanded vermiculite or foamed vermiculite, which is a porous crystal.

In addition to vermiculite, a mineral that contains moisture therein and has properties of expanding in volume at a predetermined temperature or higher may be included in the side pad 200 of the battery module 1 of the present invention. For example, the mineral may be pearlite.

For example, a pad including mica may be cured at a temperature near 500° C., preventing heat transfer, and a general fire barrier pad expands in volume at 150° C. to 200° C.

Figure 3:
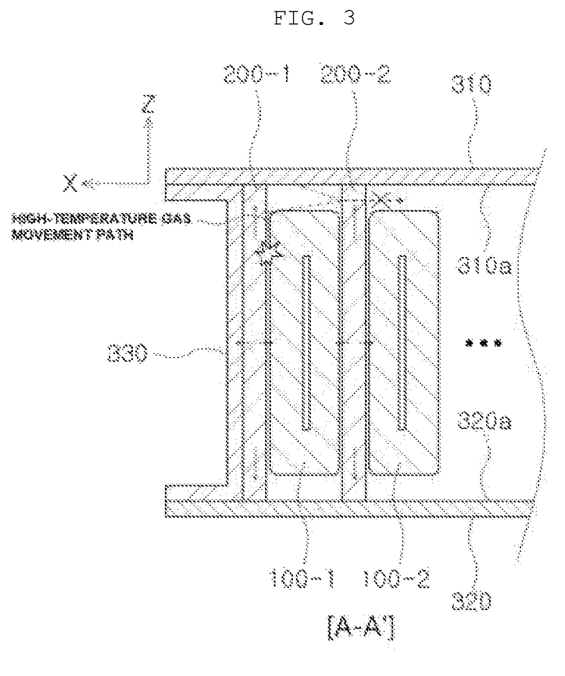
FIG. 3 shows a situation in which an event occurs in a battery cell according to the first exemplary embodiment of the present invention.

FIG. 3 shows a situation in which an event occurs in the battery cell 100 in the first exemplary embodiment of the present invention.

Here, the occurrence of an event refers to any cause situation that may cause the temperature of the battery cell 100 to rise, such as local damage to the battery cell, fire, or leakage of the battery cell due to, for example, a physical shock.

Referring to FIG. 3, when an event occurs in any one battery cell 100-1, a temperature of the corresponding battery cell 100-1 increases and temperatures of the side pads 200-1 and 200-2 disposed on both stack surfaces of the corresponding battery cell 100-1 also increase. When the temperature of the side pads 200-1 and 200-2 continues to increase, a volume of the side pads 200-1 and 200-2 begins to expand in the Z-axis direction from the predetermined temperature or higher due to an influence of the high-temperature expandable material contained therein (the side pads 200-1 and 200-2 may also expand in the X-axis and Y-axis directions, and the solid line arrows in FIG. 3 indicate an expansion direction of the side pads 200). Due to the volume expansion, upper surfaces of the side pads 200-1 and 200-2 are in close contact with an inner wall 310a of the upper plate and lower surfaces of the side pads 200-1 and 200-2 are in close contact with an inner wall 320a of the lower plate. Here, the upper surfaces and the lower surfaces of the side pads 200-1 and 200-2 are end surfaces of both ends in the Z-axis direction.

Accordingly, it is possible to block a path (dotted arrow in FIG. 3) along which the high-temperature, high-pressure gas discharged from the battery cell 100-1 in which the event occurs moves to another battery cell in which the event does not occur.

That is, in the battery module 10 according to the first exemplary embodiment of the present invention, even when an event occurs in the battery cell 100-1, an influence thereof on the other battery cells 100-2 may be minimized and the progress of the event may be delayed, so that the event situation may be suppressed at an early stage.

Meanwhile, in the battery module 1 according to the first exemplary embodiment of the present invention, the side pad 200 may further include a high-temperature curable material.

The battery cell 100-1 in which the event occurs may be subject to a swelling phenomenon due to high temperatures. The swelling phenomenon is a phenomenon in which the battery cell 100-1 swells, and when the battery cell 100-1 in which the event occurs swells and expands in volume, pressure is applied to the adjacent battery cell 100-2. If excessive pressure is applied to the adjacent battery cell 100-2 in which no event occurs, even the adjacent battery cell 100-2 may be damaged, and eventually, the event may spread to the entire battery module 1.

According to the battery module 1 of the first exemplary embodiment of the present invention, the side pad 200 expands at the predetermined temperature or higher by the high-temperature expandable material so as to be in close contact with the inner wall 310a of the upper plate and the inner wall 320a of the lower plate and subsequently be cured by a high-temperature curable material in the expanded state.

Accordingly, since the battery cell 100-1 in which the event occurs and the other battery cell 100-2 in which the event does not occur are isolated and the side pads 200-1 and 200-2 are cured in a state of being in close contact with the inner wall of the upper plate 310a and the inner wall of the lower plate 320a, a position fixing barrier wall in which upper and lower surfaces, which are both sides in the Z-axis direction, are fixed is formed.

Accordingly, even if the battery cell 100-1 in which the event occurs expands due to high temperatures, excessive pressure applied to the adjacent battery cell 100-2 may be blocked by the position fixing barrier wall.

Here, the high-temperature curable material may include ceramic.

For example, a pad including mica may include 80 wt % to 90 wt % of mica and 10 wt % to 20 wt % of silicone.

Meanwhile, the side pad 200 may include a high-temperature expandable material or a high-temperature curable material only in a portion thereof.

Figure 4:
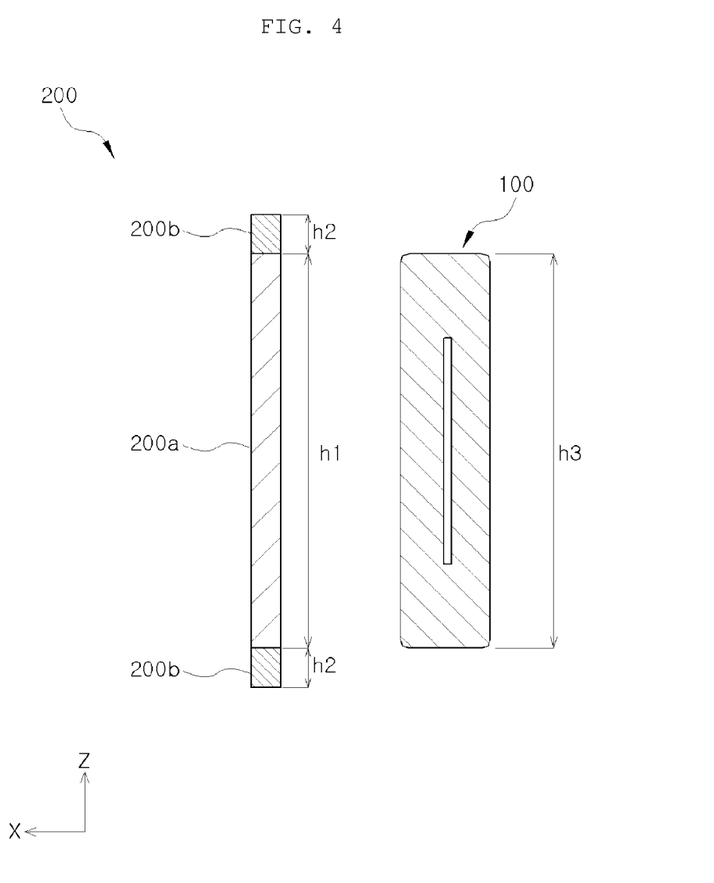
FIG. 4 is a view illustrating a side pad in the first exemplary embodiment of the present invention.

For example, referring to FIG. 4, in the side pad 200, h1 is a portion 200a that does not include a high-temperature expandable material or a high-temperature curable material, and h2 is a portion including a high-temperature expandable material or a high-temperature curable material 200b. That is, the side pad 200 may be manufactured to include a high-temperature expandable material or a high-temperature curable material only in a certain region of both ends in the Z-axis direction, which is an up-down direction, of the side pad 200. In this manner, when only the certain region of the side pad 200 includes a high-temperature expandable material or a high-temperature curable material, manufacturing costs may be reduced, compared to a case in which the entirety of the side pad 200 includes the above materials.

Here, h1 may be manufactured to be greater than or equal to a length h3 of the battery cell 100 in the Z-axis direction. In this case, the region h2 of the side pad 200 is located outside a region in which the battery cell 100 exists in the case 300. In the related art, a role of the side pad 200 is to absorb tolerance of the size of the battery cell 100, and thus, the side pad 200 is formed of a material having elasticity. However, when the side pad 200 includes a high-temperature expandable material or a high-temperature curable material, such elasticity may be lowered to weaken the original function of the tolerance absorbing function, and thus, the region h2 may be located outside the region in which the battery cell 100 exists. The lengths of h1 and h2 may be freely adjusted according to manufacturing costs of the side pad 200, required strength of the side pad 200, or the required degree of expansion of the side pad 200.

Figure 5:
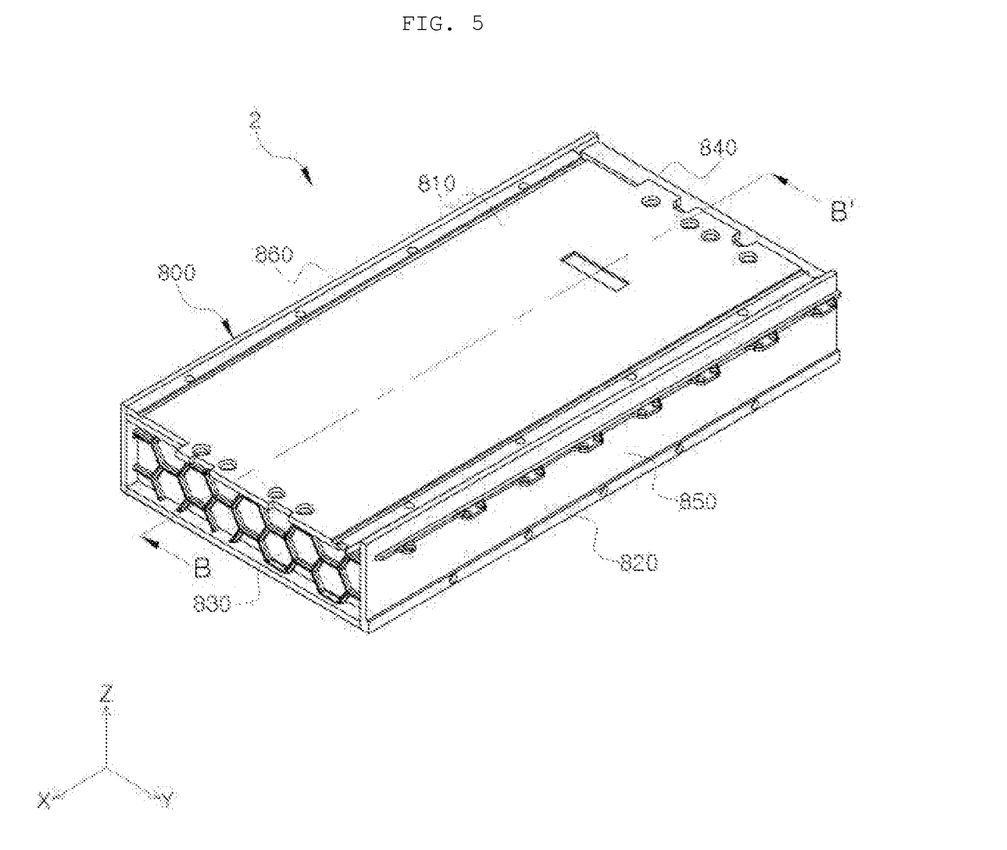
FIG. 5 shows a battery module according to a second exemplary embodiment of the present invention.
Figure 6:
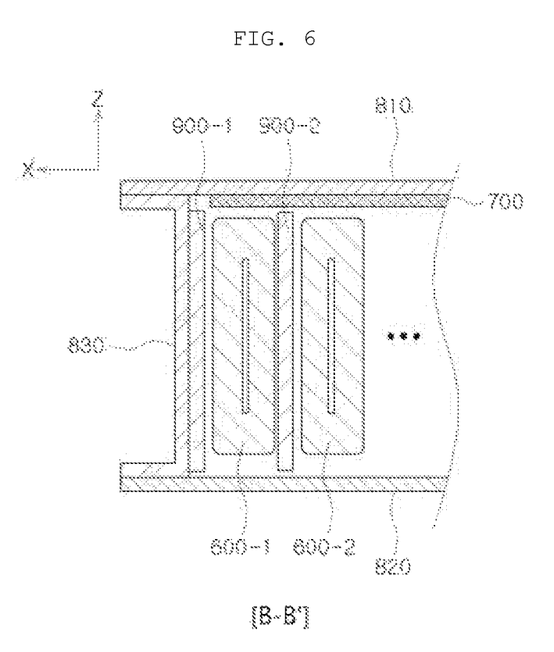
FIG. 6 is a cross-sectional view taken along line B-B' of FIG. 5.

FIG. 5 is a view illustrating a battery module 2 according to a second exemplary embodiment of the present invention, and FIG. 6 is a cross-sectional view taken along line B-B' of FIG. 5.

Referring to FIG. 5, a case 800 of the battery module according to the second exemplary embodiment of the present invention includes an upper plate 810 provided in the Z-axis direction of FIG. 5, a lower plate 820 provided on a side facing the upper plate 810, a first side plate 830 and a second side plate 840 provided in the X-axis direction of FIG. 5, and a front plate 850 and a rear plate 860 provided in the Y-axis direction of FIG. 5.

Here, referring to FIG. 6, the case 800 includes a plurality of stacked battery cells 600 and an upper pad 700 disposed between the battery cells 600 and the upper plate 810.

Here, the upper pad 700 may be attached to an inner wall 810a of the upper plate to fill a space between the upper plate 810 and the battery cell 600 or to insulate the upper plate 810 and the battery cell 600.

In addition, the upper pad 700 may include a high-temperature expandable material which is flame retardant and expands in volume at a predetermined temperature or higher, and here, the high-temperature expandable material may include a mineral which expands in volume as internal moisture thereof is vaporized at the predetermined temperature or higher, and the mineral may be vermiculite.

In addition, the battery module 2 according to the second exemplary embodiment may further include a side pad 900 disposed between stack surfaces of the plurality of battery cells 600 to absorb size tolerance of the battery cells 600.

Figure 7:
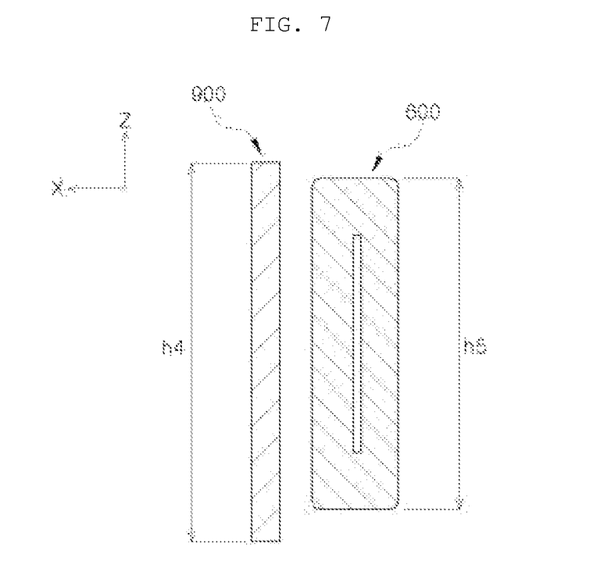
FIG. 7 is a view illustrating a comparison of lengths of a side pad and a battery cell in the second exemplary embodiment of the present invention.

Here, a length of the side pad 900 in an up-down vertical direction, i.e., a length h4 in the Z-axis direction, is greater than a length h5 of the battery cell 600 in the Z-axis direction as shown in FIG. 7, so that the upper pad 700, when it expands, may be in close contact with the side pad 900, rather than with the battery cell 600.

Figure 8:
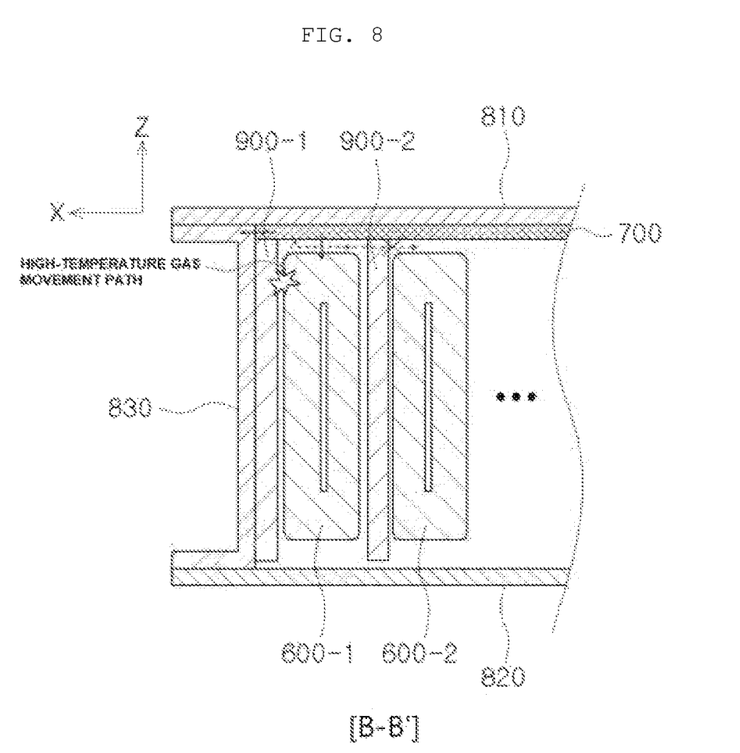
FIG. 8 illustrates a situation in which an event occurs in a battery cell when a high-temperature expandable material is included in an upper pad in the second exemplary embodiment of the present invention.

FIG. 8 illustrates a situation in which an event occurs in the battery cell 600 when a high-temperature expandable material is included in the upper pad 700 according to the second exemplary embodiment of the present invention.

Referring to FIG. 8, when an event occurs in any one battery cell 600-1, a temperature of the corresponding battery cell 600-1 increases and a temperature of the upper pad 700 disposed between the corresponding battery cell 600-1 and the upper plate 810 also increases. When the temperature of the upper pad 700 continues to increase, a volume of the upper pad 700 starts to expand in the Z-axis direction from the predetermined temperature or higher (the upper pad 700 may also expand in the X-axis and Y-axis directions and the solid arrow in FIG. 8 indicates an expansion direction of the upper pad 700).

The upper pad 700 is in close contact with the upper surface of the side pad 900 due to volume expansion. In other words, while one side of the upper pad 700 in the Z-axis direction is attached to and in close contact with the inner wall 810*a* of the upper plate, the other side of the upper pad 700 in the Z-axis direction expands in volume in the direction of the battery cell 600 so as to be in close contact with the upper surface of the side pad 900, and as shown in FIG. 8, the battery cell 600-1 in which the event occurs is trapped between the upper pad 700 and the side pads 900-1 and 900-2.

Accordingly, a path along which a high-temperature, high-pressure gas discharged from the battery cell 600-1 in which the event occurs moves to another battery cell 600-2 in which no event occurs may be blocked.

That is, the battery module 2 according to the second exemplary embodiment of the present invention has an effect that even when an event occurs in the battery cell 600, the progress of the event may be delayed and the event may be suppressed at an early stage.

Meanwhile, in the battery module 2 according to the second exemplary embodiment of the present invention, the upper pad 700 may further include a high-temperature curable material, and here, the high-temperature curable material may be ceramic. In addition, the high-temperature curable material may be a pad including 80 wt % to 90 wt % of mica and 10 wt % to 20 wt % of silicone.

That is, the upper pad 700 may expand in volume at the predetermined temperature or higher by a high-temperature expandable material so as to be in close contact with the inner wall 810*a* of the upper plate and the upper surface of the side pad 900, and may be cured by the high-temperature curable material in the expanded state.

Figure 9:
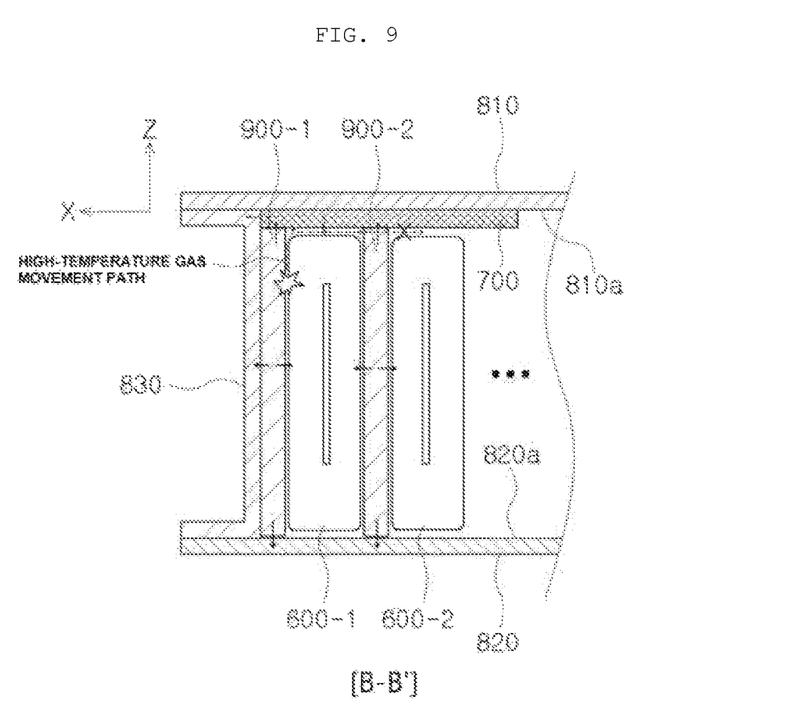
FIG. 9 illustrates a situation in which an event occurs in a battery cell when a high-temperature expandable material is included in an upper pad and a side pad according to the third exemplary embodiment of the present invention.

FIG. 9 shows a situation in which an event occurs in the battery cell 600 when a high-temperature expandable material is included in the upper pad 700 and the side pad 900 in the third exemplary embodiment of the present invention.

In the battery module 2 according to the third exemplary embodiment, the side pad 900 may include a high-temperature expandable material which is flame retardant and expands in volume at a predetermined temperature or higher, like the upper pad 700.

In addition, in the battery module 2 according to the third exemplary embodiment, the side pad 900 may further include a high-temperature curable material.

In the battery module 2 according to the third exemplary embodiment of the present invention, in a case in which both the upper pad 700 and the side pad 900 include a high-temperature expandable material, if an event occurs in the battery cell 600, both the upper pad 700 and the side pad 900 expand in the Z-axis direction as shown in FIG. 9 (the upper pad 700 and the side pad 900 may also expand in the X-axis and Y-axis directions, and the solid arrow in FIG. 9 indicates an expansion direction of the upper pad 700 an the side pad 900).

More specifically, the upper pad 700 expands in the Z-axis direction, i.e., in the direction in which the battery cell 600 exists, and the side pad 900 expands in both sides of the Z-axis direction until the side pad 900 is in close contact with the upper pad 700 and an inner wall 820*a* of the lower plate. As a result, an upper surface of the side pad 900, which is one side thereof in the Z-axis direction, is in close contact with and fixed to the upper pad 700, and a lower surface of the side pad 900, which is the other side thereof, is in close contact with and fixed to the inner wall 820*a* of the lower plate, and the battery cell 600-1 in which an event occurs is trapped between the upper pad 700 and the side pads 900-1 and 900-2 as shown in FIG. 9.

That is, when an event occurs, the side pad 900 and the upper pad 700 expand together to block a movement path of the high-temperature, high-pressure gas occurring due to the event.

In addition, in this case, the side pad 900 is cured in an expanded state, so that it may serve as a barrier wall between the battery cells as in the first exemplary embodiment.

As described above, since the battery module of the present invention includes a pad having characteristics of expanding at a predetermined temperature or higher, a path along which a high-temperature, high-pressure gas discharged from the battery cell in which an event occurs moves may be blocked, and thus, the gas is prevented from spreading to other battery cells.

In addition, since the battery module of the present invention includes a pad which is cured after expanding at a predetermined temperature or higher, a barrier wall which isolates a battery cell in which an event occurs from other battery cells may be formed, and thus, the progress of the event may be delayed.

Although the present disclosure has been described by limited exemplary embodiments and drawings, the present disclosure is not limited to the exemplary embodiments described above and various modifications and changes can be made by a person having an ordinary skill in the art to which the present disclosure pertains, from the descriptions above. Therefore, the spirit of the present disclosure is defined only by the appended claims, and encompasses all modifications and equivalents that fall within the scope of the appended claims.

DETAILED DESCRIPTION OF MAIN ELEMENTS

1, 2: battery module
100, 100-1, 100-2, 600, 600-1, 600-2: battery cell
110-1, 110-2: electrode tab
200, 200-1, 200-2, 900, 900-1, 900-2: side pad
300, 800: case
310, 810: upper plate
320, 820: lower plate
330, 830: first side plate
340, 840: second side plate
350, 850: front plate
360, 860: rear plate
700: upper pad

What is claimed is:
1. A battery module comprising:
a plurality of stacked battery cells;
a side pad disposed between stack surfaces of the plurality of battery cells; and
a case accommodating the plurality of battery cells and the side pad,
wherein the side pad includes a central region that is made of a first material that is a flame retardant material and lower and upper end regions in an up-down direction of the side pad which are made of a second material that is high-temperature expandable and flame retardant that expands in volume at a predetermined temperature or higher.

2. The battery module of claim 1, wherein the lower and upper end regions of the side pad expand so as to contact an upper inner wall and a lower inner wall of the case, respectively, to block a path along which a gas discharged from a battery cell in which an event occurs, among the plurality of battery cells, moves to a battery cell in which the event does not occur, among the plurality of battery cells.

3. The battery module of claim 1, wherein the second material includes a mineral which expands in volume as internal moisture thereof is vaporized at the predetermined temperature or higher.

4. The battery module of claim 3, wherein the mineral is vermiculite.

5. The battery module of claim 1, wherein the side pad further includes a high-temperature curable material.

6. The battery module of claim 5, wherein the high-temperature curable material includes ceramic.

7. The battery module of claim 5, wherein the high-temperature curable material includes 80 wt % to 90% wt % of mica and 10 wt % to 20 wt % of silicone.

8. A battery module comprising:
a plurality of stacked battery cells;
a case accommodating the plurality of battery cells;
an upper pad disposed between the plurality of battery cells and an upper inner wall of the case, and
a side pad disposed between stack surfaces of the plurality of battery cells,
wherein the upper pad and the side pad include a material which is flame retardant and expands in volume at a predetermined temperature or higher, and
a vertical length of the side pad is longer than a vertical length of each of the battery cells such that when the upper pad expands, the upper pad is in close contact with the side pad rather than each of the battery cells.

9. The battery module of claim 8, wherein the upper pad expands in volume at the predetermined temperature or higher as to be in close contact with an upper inner wall of the case and an upper surface of the expandable side pad to block a path along which a gas discharged from a battery cell in which an event occurs, among the plurality of battery cells, moves to a battery cell in which the event does not occur, among the plurality of battery cells.

10. The battery module of claim 8, wherein the material includes a mineral which expands in volume as internal moisture thereof is vaporized at the predetermined temperature or higher.

11. The battery module of claim 10, wherein the mineral is vermiculite.

12. The battery module of claim 8, wherein the upper pad further includes a high-temperature curable material.

13. The battery module of claim 12, wherein the high-temperature curable material includes ceramic.

14. The battery module of claim 8, wherein the side pad further includes a high-temperature curable material.

* * * * *